United States Patent
Singh et al.

(10) Patent No.: US 8,359,024 B1
(45) Date of Patent: Jan. 22, 2013

(54) NOTIFICATION AND PROTECTION FOR WIRELESS COMMUNICATION SESSION DROPS

(75) Inventors: Jasinder Pal Singh, Olathe, KS (US); Mark Edward Hanna, Kansas City, MO (US); Bhagwan Singh Khanka, Lenexa, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 691 days.

(21) Appl. No.: 12/615,840

(22) Filed: Nov. 10, 2009

(51) Int. Cl.
*H04B 7/00* (2006.01)

(52) U.S. Cl. .................. 455/423; 455/67.11; 370/329

(58) Field of Classification Search .................. 455/423, 455/424, 425, 450, 67.11, 67.14, 67.7, 550.1, 455/556.1, 556.2, 575.1; 370/216, 328, 329
See application file for complete search history.

(56) References Cited

U.S. PATENT DOCUMENTS

| 7,099,681 B2 | 8/2006 | O'Neill | |
|---|---|---|---|
| 7,505,474 B2 | 3/2009 | Walter | |
| 7,536,192 B2 | 5/2009 | O'Neill | |
| 2006/0146695 A1* | 7/2006 | Maheshwari et al. | 370/216 |
| 2006/0154692 A1* | 7/2006 | Ikehara et al. | 455/556.2 |
| 2011/0096737 A1* | 4/2011 | Venkatachalam et al. | 370/329 |
| 2011/0223905 A1* | 9/2011 | Lee et al. | 455/423 |

* cited by examiner

*Primary Examiner* — Thanh Le (57) ABSTRACT

A communication system provides a wireless communication session to a user device over a forward link and a reverse link. A wireless network determines that drop notification and protection is effective for the session and detects session loss on the reverse link. The network transfers a session loss indication to the user device to over the forward link and transfers a protection notice to the other communication end-point. The user device receives the session loss indication over the forward link and notifies the user. The user device transfers recovery probes over the reverse link. The network detects session recovery on the reverse link and transfers a session recovery indication to the user device over the forward link. The network transfers a recovery notice to the communication end-point. The user device receives the session recovery indication over the forward link and notifies the user of the session recovery.

20 Claims, 8 Drawing Sheets

NOTIFICATION AND PROTECTION FOR WIRELESS COMMUNICATION SESSION DROPS

TECHNICAL BACKGROUND

User communication devices and wireless access networks communicate over wireless links to provide the users with various services, such a voice calls, web surfing, and media downloads. In the direction from the access network to the user devices, these wireless communications traverse forward links. In the direction from the user devices to the access network, the wireless communications traverse reverse links.

During a wireless communication session, various conditions may cause a loss of effective wireless communication which is referred to as a session drop. For example, excessive noise or distance may cause a session drop. In some cases, either the reverse link or the forward link will drop before the other link to leave a short time period when one link is still operational. In some cases, the remaining operational link may not drop at all.

After a session drop, the proximate user device typically provides a message to the user stating "signal faded" but the user on the other end of the session may not receive any notification at all. The user on the other end may attempt to continue the session, and if the forward link has failed, the person on the other end may still receive communications without realizing that their own communications are not getting through. In addition, both of the users (or the network) may attempt to reestablish the dropped session, but these efforts may not be effectively coordinated. Thus, confusion often occurs after a session drop and during the effort to re-establish the session.

OVERVIEW

A communication system provides a wireless communication session to a user device over a forward link and a reverse link. A wireless network determines that drop notification and protection is effective for the session and detects session loss on the reverse link. The wireless network transfers a session loss indication to the user device over the forward link and transfers a session drop and protection notice to the other communication end-point. The user device receives the session loss indication over the forward link and notifies the user. The user device also transfers recovery probes over the reverse link. The communication endpoint typically presents the session drop and protection notice to the far-end user. The network detects session recovery on the reverse link and transfers a session recovery indication to the user device over the forward link. The user device receives the session recovery indication over the forward link and notifies the user of the session recovery. The network transfers a session recovery notice to the communication end-point which typically presents the recovery notice to the far-end user.

DETAILED DESCRIPTION

Figure 1:
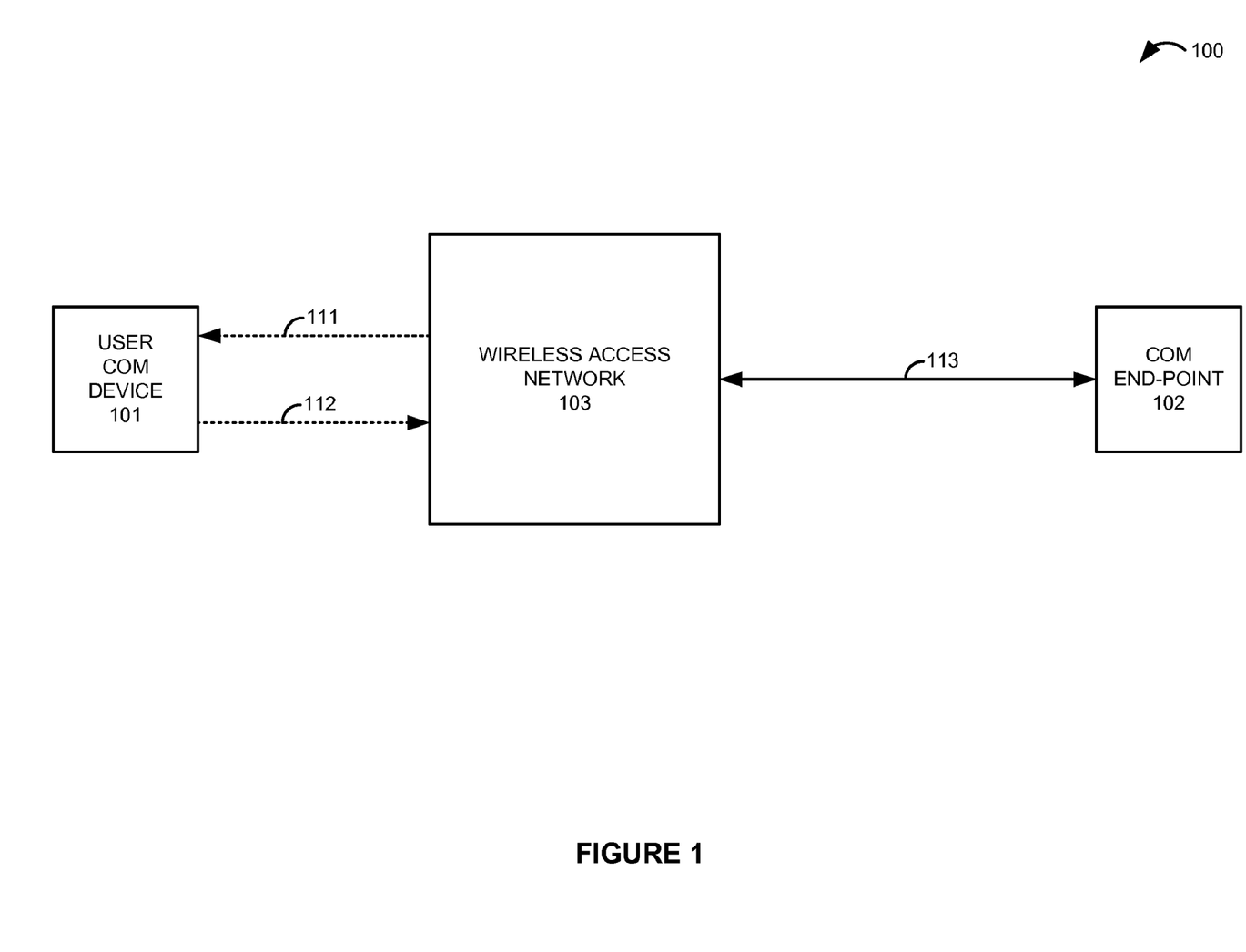
FIG. 1 illustrates a communication system that provides notification and protection for wireless communication session drops.

FIG. 1 illustrates communication system 100 that provides notification and protection for wireless communication session drops. Communication system 100 comprises user communication device 101, communication endpoint 102, and wireless access network 103. User communication device 101 and communication endpoint 102 are components capable of network communication, such as computers, telephones, servers, cameras, media players, internet appliances, data storage devices, and the like.

Wireless access network 103 wirelessly transfers communications to user communication device 101 over forward link 111. User communication device 101 wirelessly transfers communications to wireless access network 103 over reverse link 112. Wireless access network 103 exchanges communications with communication endpoint 102 over communication link 113. Thus, user communication device 101 transfers communications to communication endpoint 102 over links 112-113 and network 103, and communication endpoint 102 transfers communications to user communication device 101 over network 103 and links 111 and 113.

Figure 2:
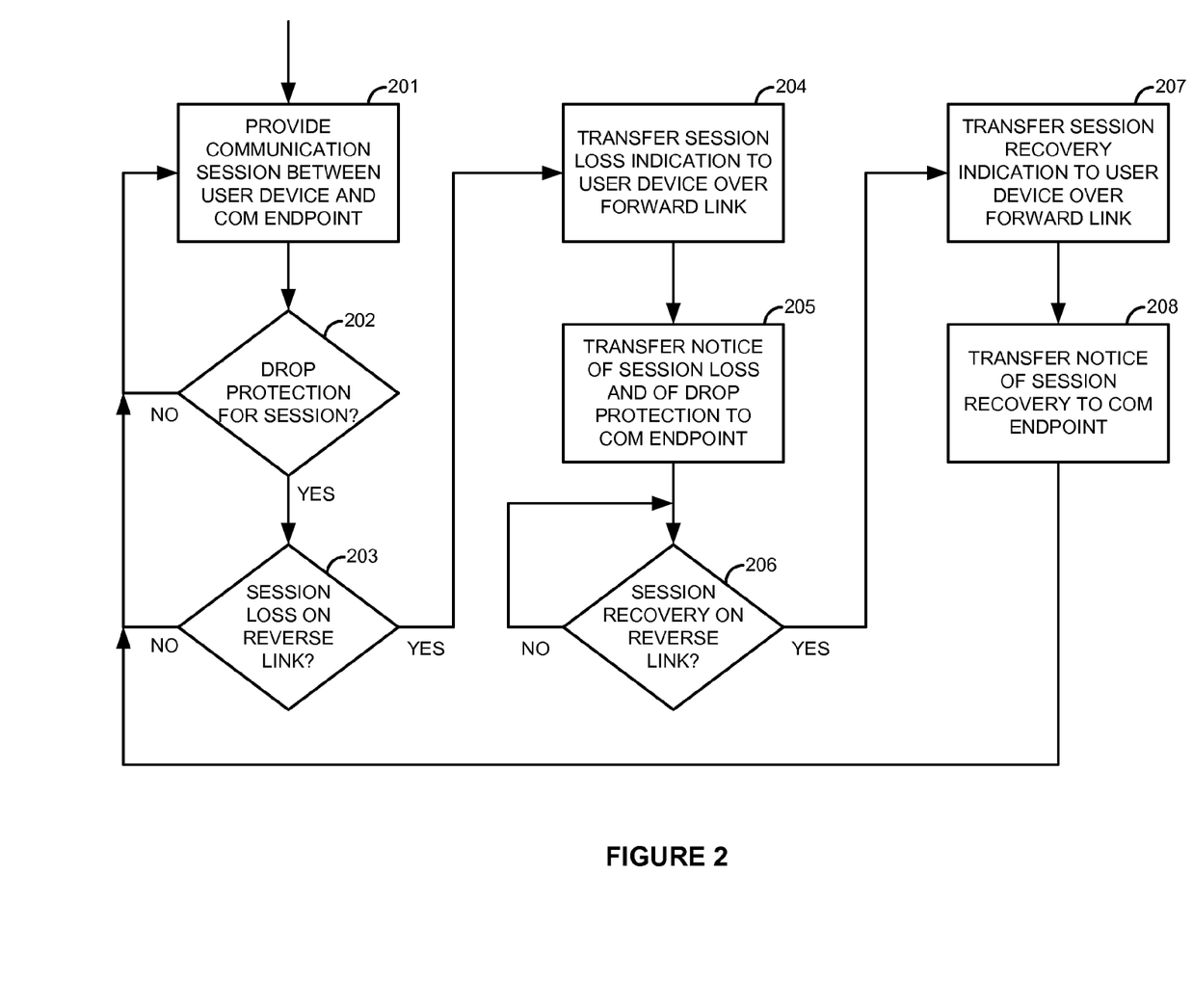
FIG. 2 illustrates the operation of a wireless access network to provide notification and protection for wireless communication session drops on the reverse link.

FIG. 2 illustrates the operation of wireless access network 103 to provide notification and protection for wireless communication session drops on reverse link 112. Wireless access network 103 provides a communication session between user communication device 101 and communication endpoint 102 (201). The communication session could be a voice call, video download, data transfer, web interaction, or some other transfer of communications. Wireless access network 103 determines if dropped session protection is effective for the communication session (202). The determination could be based on a user instruction, customer plan, user location, drop history, or some other factor—including combinations thereof.

If dropped session protection is effective for the communication session (202), then wireless access network 103 monitors reverse link 112 to detect session loss (203). Session loss could be detected by a loss of signal, low signal strength, low signal-to-noise ratio, high error rate, high packet loss rate, or some other condition that renders the communication session ineffective. If session loss on reverse link 112 is detected (203), wireless access network 103 transfers a session loss indication over forward link 111 to user communication device 101 (204). The session loss indication could be a message, overhead data, tone sequence, or some other indicator, and the transfer could occur over an overhead channel or a traffic channel.

Wireless access network 103 also transfers a notice to communication endpoint 102 that indicates that the communication session was lost, but that drop protection is effective (205). For example, wireless access network 103 might play an audio message to communication endpoint 102 that states, "we are experiencing technical difficulties with your voice call, please standby as we attempt to re-establish the call." Alternatively, wireless access network 103 might send a data message with similar content to communication endpoint 102.

Wireless access network 103 monitors reverse link 112 to detect session recovery (206). Session recovery could be detected by a receipt of a probe or other signal from user communication device 101. If session recovery on reverse link 112 is detected (206), wireless access network 103 transfers a session recovery indication over forward link 111 to user communication device 101 (207). The session recovery indication could be a message, overhead data, tone sequence, or some other indicator, and the transfer could occur over an overhead channel or a traffic channel. Wireless access network 103 also transfers another notice to communication endpoint 102 that indicates that the communication session has recovered (208). For example, wireless access network 103 might play an audio message to communication endpoint 102 that states, "your voice call has been reconnected, thank you for your patience." Alternatively, wireless access network 103 might send a data message with similar content to communication endpoint 102.

Figure 3:
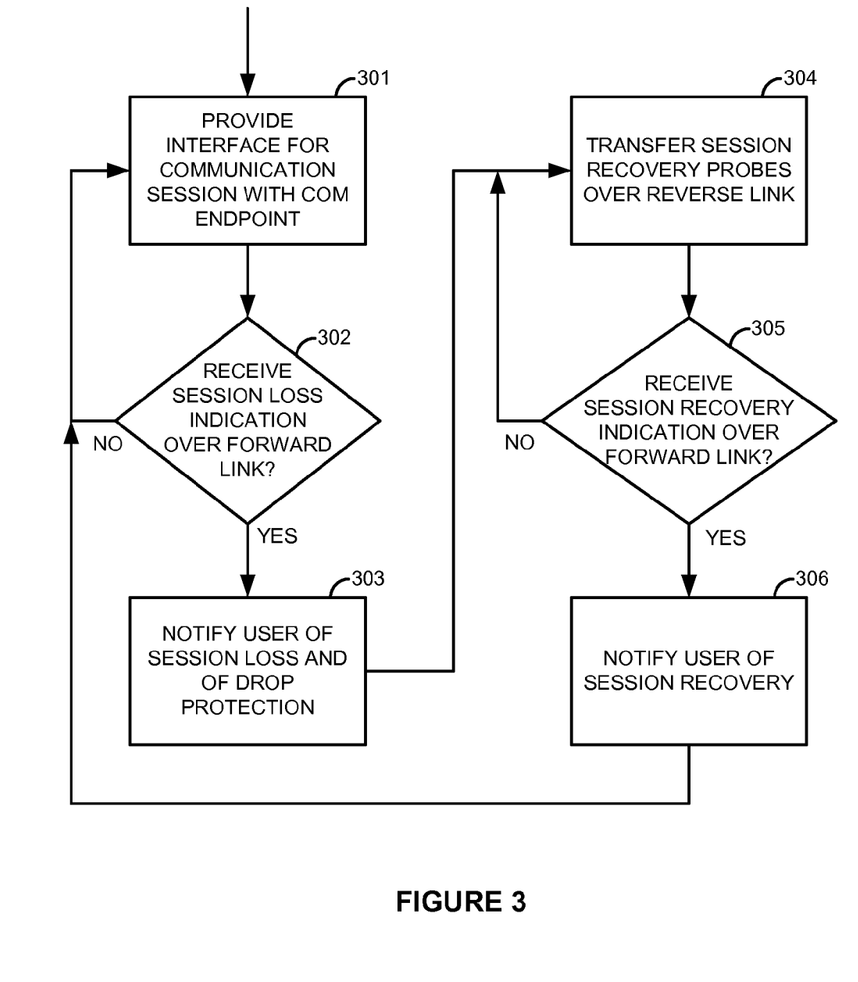
FIG. 3 illustrates the operation of a user communication device to provide notification and protection for wireless communication session drops on the reverse link.

FIG. 3 illustrates the operation of user communication device 101 to provide notification and protection for wireless communication session drops on reverse link 112. User communication device 101 provides an interface for the communication session with communication endpoint 101 (301). Typically, the interface allows the user to initiate or accept the communication session. The interface also exchanges communications between the user and the wireless access system 103.

If user communication device 101 receives the session loss indication from wireless access system 103 over forward link 111 (302), user device 101 notifies the user that the communication session was lost, but that drop protection is effective (303). For example, user communication device 101 might play an audio message to the user that states, "we are experiencing technical difficulties with your voice call, please standby as we attempt to re-establish the call." Alternatively, user communication device 101 might display a similar data message.

After receiving the session loss indication from wireless access system 103 over forward link 111 (302), user device 101 transfers session recovery probes over reverse link 112 (304). The session recovery probes could be new session requests, session recovery requests, data, tones, or some other signal, and the recovery probes could traverse a traffic channel or an overhead channel. If user communication device 101 receives the session recovery indication from wireless access system 103 over forward link 111 (305), user device 101 notifies the user that the communication session has recovered (306). For example, user communication device 101 might play an audio message to the user that states, "your voice call has been reconnected, thank you for your patience." Alternatively, user communication device 101 might display a similar data message.

Figure 4:
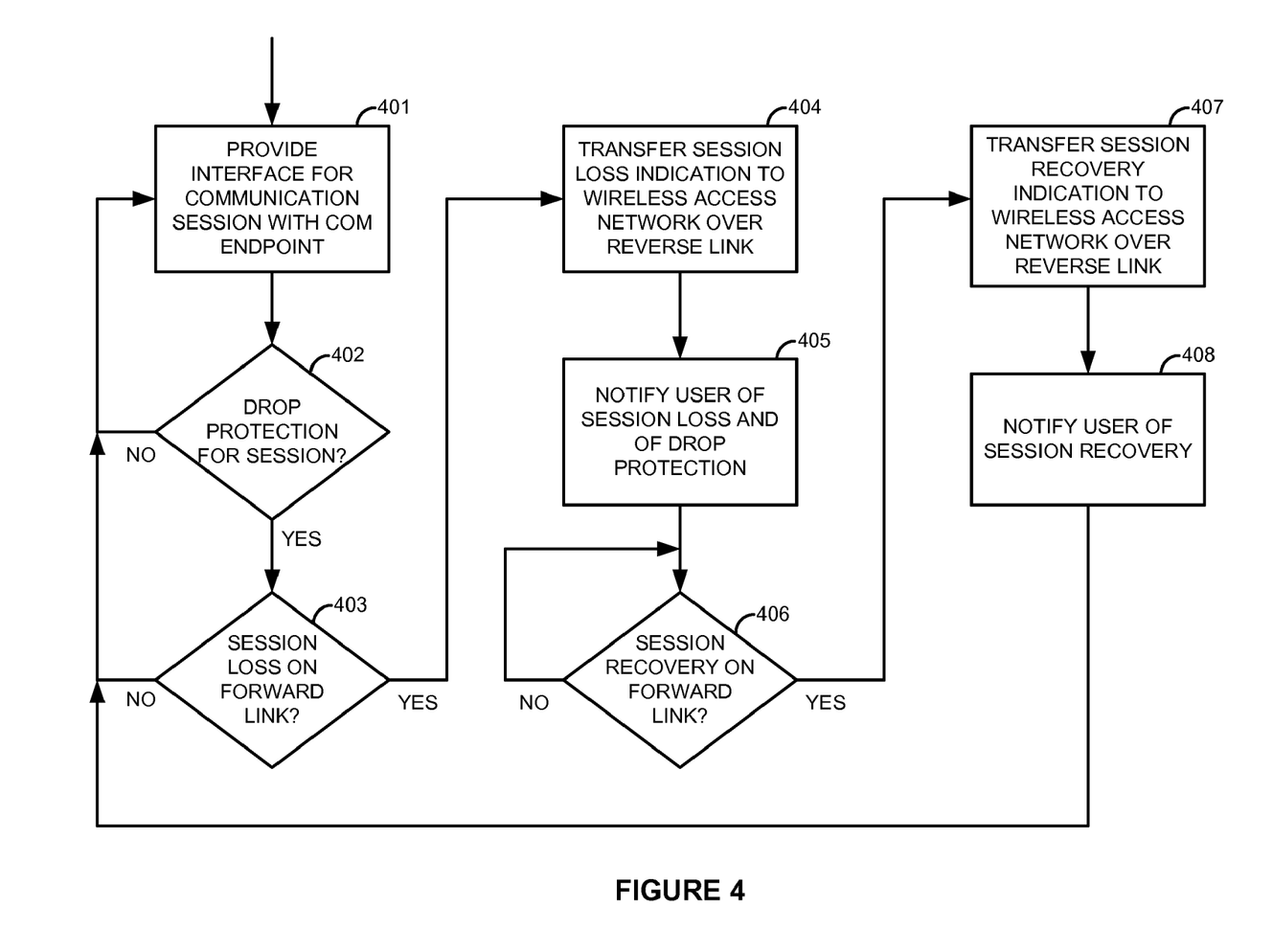
FIG. 4 illustrates the operation of a user communication device to provide notification and protection for wireless communication session drops on the forward link.

FIG. 4 illustrates the operation of user communication device 101 to provide notification and protection for wireless communication session drops on forward link 111. User communication device 101 provides an interface for the communication session with communication endpoint 101 (401). Typically, the interface allows the user to initiate or accept the communication session. The interface also exchanges communications between the user and the wireless access system 103. The communication session could be a voice call, video download, data transfer, web interaction, or some other transfer of communications. User communication device 101 determines if dropped session protection is effective for the communication session (402). The determination could be based on a user instruction, customer plan, user location, drop history, or some other factor—including combinations thereof.

If dropped session protection is effective for the communication session (402), user communication device 101 monitors forward link 111 to detect session loss (403). Session loss could be detected by a loss of signal, low signal strength, low signal-to-noise ratio, high error rate, high packet loss rate, or some other condition that renders the communication session ineffective. If session loss on forward link 111 is detected (403), user communication device 101 transfers a session loss indication over reverse link 112 to wireless access system 103 (404). The session loss indication could be a message, overhead data, tone sequence, or some other indicator, and the transfer could occur over an overhead channel or a traffic channel. User communication device 101 also notifies the user that the communication session was lost, but that drop protection is effective (405). For example, user communication device 101 might play an audio message to the user that states, "we are experiencing technical difficulties with your voice call, please standby as we attempt to re-establish the call." Alternatively, user communication device 101 might display a similar data message to the user.

User communication device 101 monitors forward link 111 to detect session recovery (406). Session recovery could be detected by receipt of a probe or other signal from wireless access system 103. If session recovery on forward link 111 is detected (406), user communication device 101 transfers a session recovery indication over reverse link 112 to user communication device 101 (407). The session recovery indication could be a message, overhead data, tone sequence, or some other indicator, and the transfer could occur over an overhead channel or a traffic channel. User communication device 101 also notifies the user that that the communication session has recovered (408). For example, user communication device 101 might play an audio message to the user that states, "your voice call has been reconnected, thank you for your patience." Alternatively, user communication device 101 might display a similar data message to the user.

Figure 5:
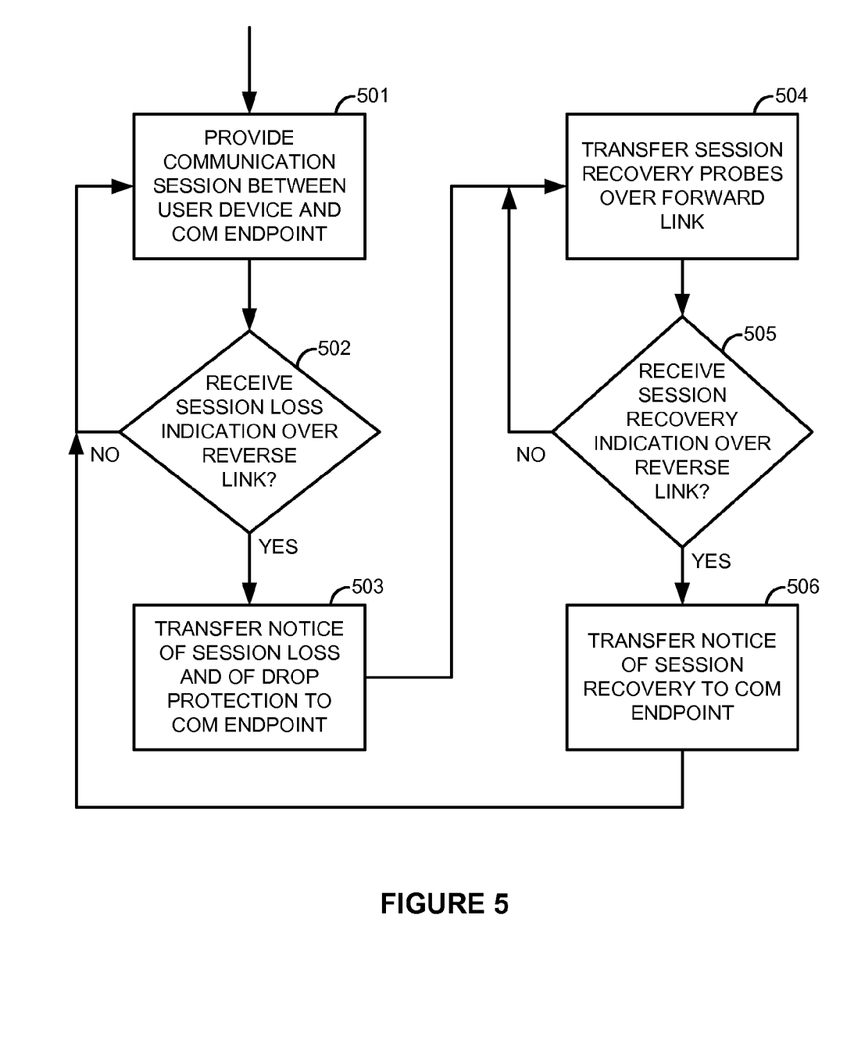
FIG. 5 illustrates the operation of a wireless access network to provide notification and protection for wireless communication session drops on the forward link.

FIG. 5 illustrates the operation of wireless access network 103 to provide notification and protection for wireless communication session drops on forward link 111. Wireless access network 103 provides the communication session between user communication device 101 and communication endpoint 102 (501).

If wireless access network 103 receives the session loss indication from user communication device 101 over reverse link 112 (502), wireless access network 103 transfers a notice to communication endpoint 102 indicating that the communication session was lost, but that drop protection is effective. For example, wireless access network 103 might play an audio message to communication endpoint 102 that states, "we are experiencing technical difficulties with your voice call, please standby as we attempt to re-establish the call." Alternatively, wireless access network 103 might send a data message with similar content to communication endpoint 102.

After receiving the session loss indication from user communication device 101 over reverse link 112 (502), wireless access network 103 transfers session recovery probes over forward link 111 (504). The session recovery probes could be new session requests, session recovery requests, data, tones, or some other signal, and the recovery probes could traverse a traffic channel or an overhead channel. If wireless access network 103 receives the session recovery indication from user communication device 101 over reverse link 112 (505), wireless access network 103 transfers a another notice to communication endpoint 102 indicating that the communication session has recovered (506). For example, wireless access network 103 might play an audio message to communication endpoint 102 that states, "your voice call has been reconnected, thank you for your patience." Alternatively, wireless access network 103 might send a data message with similar content.

In the above-described operations, various techniques could be used to recover the communication session. In one example, the recovery probes could use the same channel as the user traffic, and probe receipt would indicate that the traffic channel has recovered. In another example, the recovery probes could request a replacement communication session with new network resources, and the new replacement session with the new network resources would be presented to the user and the communication endpoint as the recovered session.

In the above operations, one of the links remains operational for at least a short time period after the other link has failed. This time period enables the transfer of the session loss indicator to initiate the notifications and recovery probes. If the operational link eventually fails, a recovery process is performed on that link using the recovered link (the originally failed link). Once both links have recovered, the recovery notices are provided and the session proceeds.

In the above operations, various techniques can be used to determine if notification and protection is effective for a communication session. The user could set up notification and protection in their customer plan for various session types or called numbers. The wireless access network and user communication device are then configured to implement the customer plan based on the user's identity.

The user could set up notification and protection in their contact list for various called numbers. The user communication device would then inform the wireless access network of the user instructions including the selected called numbers. The wireless access network and user communication device would implement the notification and protection for the selected called numbers based on the user instruction.

The wireless access network and user device could implement the notification and protection for a communication session based on wireless communication measurements, such as Radio Frequency conditions. If signal strength, loading, or noise become a problem, then the wireless access network could instruct the user communication device to implement the notification and protection for the communication session. Likewise, the user communication device could detect the RF problem and instruct the wireless access network to implement the notification and protection for the communication session.

The user communication device could implement the notification and protection for the communication session based on a user input. For example, a menu selection may allow the user to invoke the notification and protection for an individual session during session initiation. A special dialing prefix (*99) could be used to invoke the notification and protection for a voice call. The user communication device could notify the wireless access system of the user input, or the wireless access system could detect the user input from the session initiation signaling.

The user communication device and wireless access network could implement the notification and protection for the communication session based on session history. For example, the notification and protection might be provided for the top five called numbers or web sites visited. The user communication device would track the session history and notify the wireless access system when notification and protection is effective due to the session history.

In another example, the user communication device and/or the wireless access network could track dropped calls for the user over time. If multiple sessions are dropped over a short period, then the user communication device and the wireless access network would communicate to turn on the notification and protection. When session drops eventually reduce in frequency, the user communication device and the wireless access network would communicate to turn off the notification and protection.

The notification and protection could be provided for the calls to a queue or for a media download. For example, the called number or uniform resource locator could indicate a session with a call queue or media download. In another example, the wireless communication device or the network could monitor the reverse link for silence (indicating a call queue or media download). The notification and protection would then be implemented for a communication session based on reverse link silence. Reverse link silence and called number or uniform resource locator could be also used in combination.

The notification and protection could be implemented based on the geographic location of the user communication device and dropped session history. In one example, the user communication device associates previous dropped sessions with their geographic locations to identify trouble areas that are prone to session drops for that user. When the user communication device approaches one of these geographic trouble areas, then the device would instruct the wireless access system to implement the notification and protection for the session. Likewise, the wireless access system could track dropped sessions with geographic locations on a network-wide basis to identify trouble areas that are prone to session drops for all users. The wireless access system could then instruct the user communication devices to implement the notification and protection when they approach those trouble areas. Thus, geographic location could be combined with dropped call history to implement the notification and protection when the user communication device approaches a trouble area.

For example, a user may often drive on a road through a location that is prone to dropped calls. The user's phone could track these drops and associate them with the location. The user's phone would then and implement the notification and protection for the user when drive through the location. Note that the protection automatically recovers the call, and the notification automatically avoids confusion on either end of the call.

Figure 6:
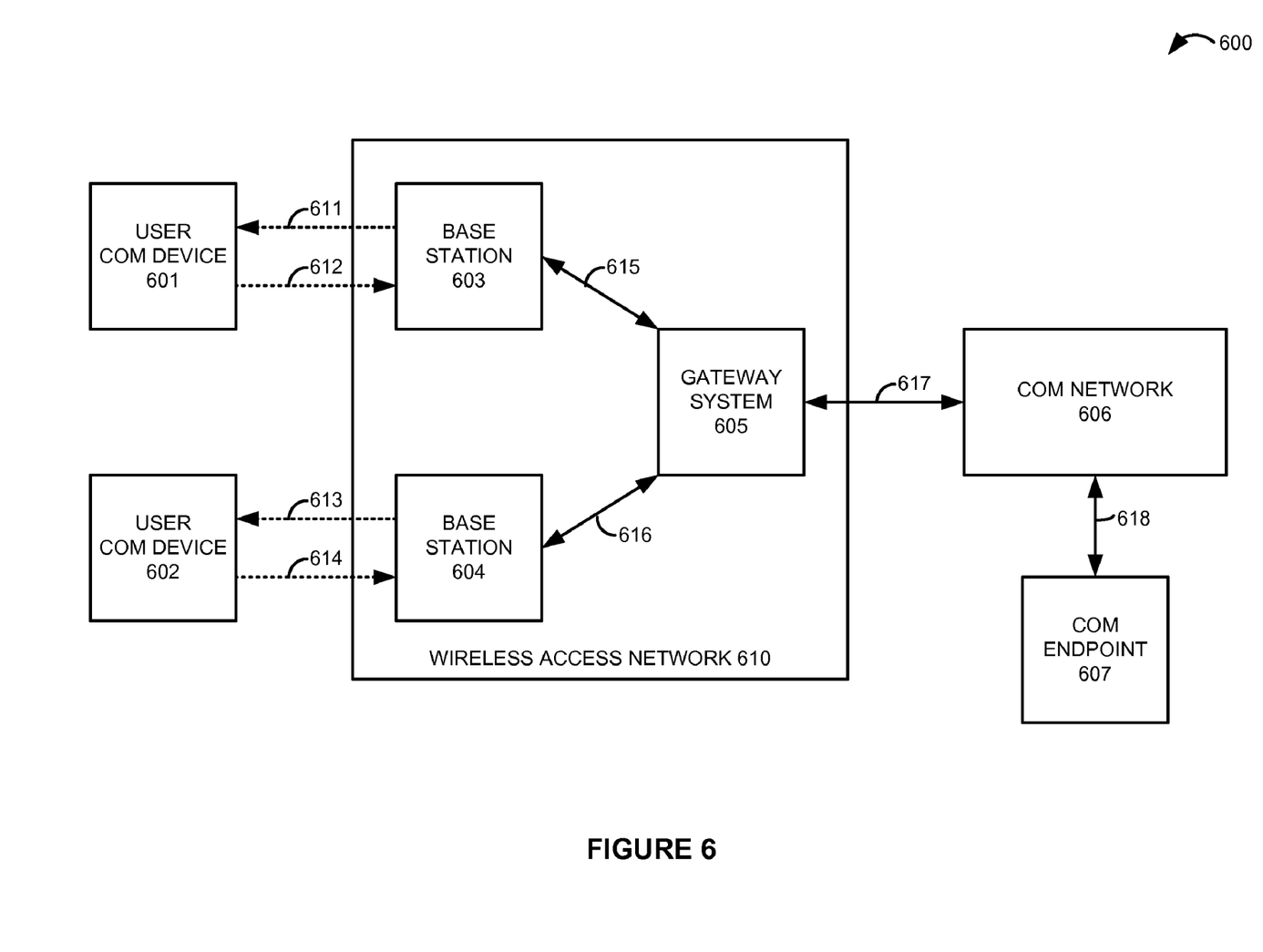
FIG. 6 illustrates a communication system to provide notification and protection for wireless communication session drops.

FIG. 6 illustrates communication system 600 to provide notification and protection for wireless communication session drops. Communication system 600 comprises user communication devices 601-602, wireless access network 610, communication network 606, and communication endpoint 607. Wireless access network 610 comprises base stations 603-604 and gateway system 605.

User communication device 601 and base station 603 communicate over forward link 611 and reverse link 612. User communication device 602 and base station 604 communicate over forward link 613 and reverse link 614. Base station 603 and gateway system 605 communicate over backhaul link 615. Base station 604 and gateway system 605 communicate over backhaul link 616. Gateway system 605 and communication network 606 communicate over network link 617. Communication network 606 and communication endpoint 607 communicate over access link 618.

User communication devices 601-602 are configured and operate as described above for user communication device 101. In some examples, base stations 603-604 are each configured and operate as described above for wireless access network 103. In other examples, gateway system 605 is configured and operates as described above for wireless access network 103. In yet other examples, base stations 603-604 and gateway system 605 are configured and operate in combination as described above for wireless access network 103.

Note that user communication devices 601-602 can also operate as described above for communication endpoint 102. For example, on a voice call from user communication device 601 to user communication device 602, user communication device 601 and base station 603 could implement the notification and protection described above, while user communication device 602 acts as the communication endpoint Likewise, user communication device 602 and base station 604 could implement the notification and protection described above, while user communication device 601 acts as the communication endpoint. In addition, user communication devices 601-602 and wireless access network 610 could implement the notification and protection on the same session, with the communication endpoint role being dependent on where the session drop occurs.

Figure 7:
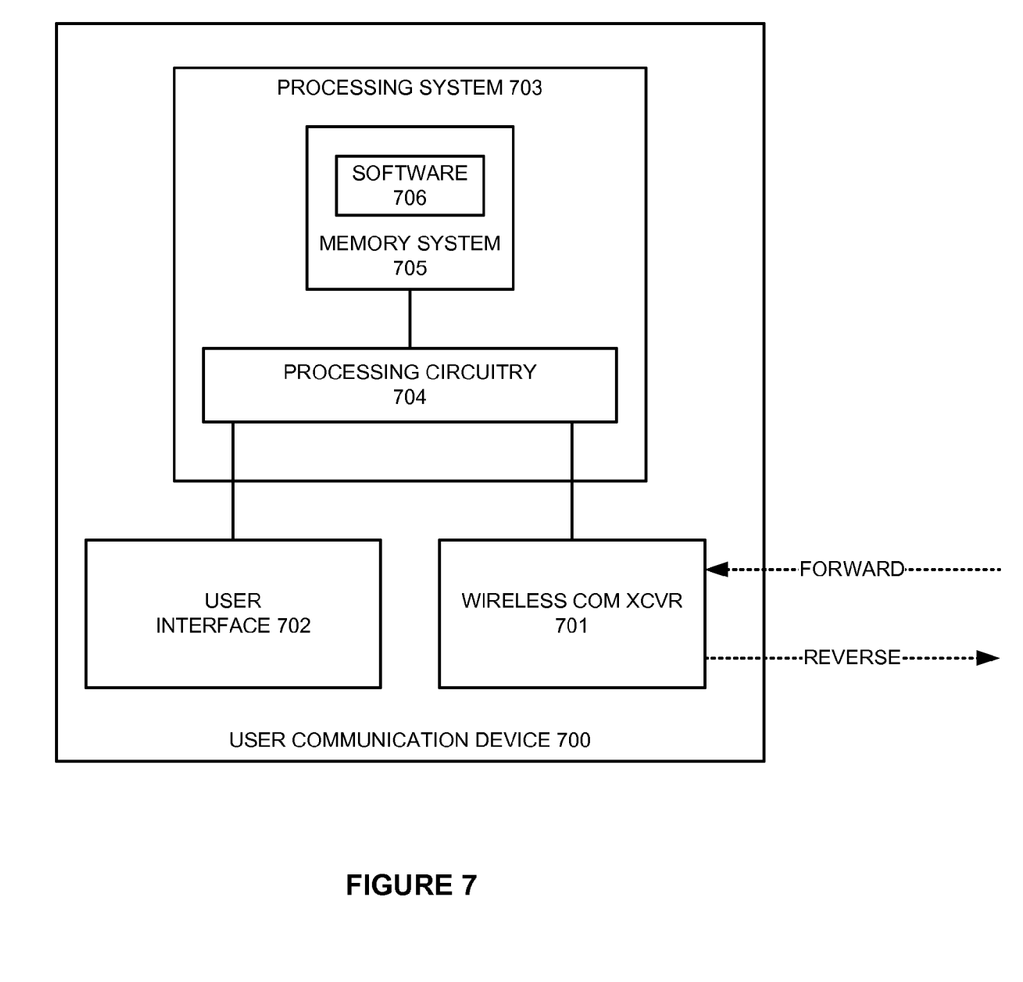
FIG. 7 illustrates a user communication device to provide notification and protection for wireless communication session drops.

FIG. 7 illustrates user communication device 700 to provide notification and protection for wireless communication session drops. User communication device 700 is an example of user communication devices 101 and 601-602, although devices 101 and 601-602 may use alternative configurations. User communication device 700 could be a discrete system, a distributed system, or could be integrated into other systems. User communication device 700 comprises wireless communication transceiver 701, user interface 702, and processing system 703. Processing system 703 comprises processing circuitry 704 and memory system 705 that stores operating software 706. Processing system 703 is linked to wireless communication transceiver 701 and user interface 702. User communication device 700 may include other well-known components that are not shown for clarity, such as enclosures, additional communication interfaces, and power systems.

Wireless communication transceiver 701 comprises an antenna, filter, amplifier, signal processing circuitry, software, and/or some other communication components. Communication transceiver 701 may use various wireless protocols for wireless communication, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format—including combinations thereof. Wireless communication transceiver 701 receives wireless communications over a forward link and transfers wireless communications over a reverse link. Wireless communication transceiver 701 detects session loss over the forward link and sends recovery probes over the reverse link.

User interface 702 comprises components that interact with a user. The components may include a keyboard, display, lights, buttons, touch-screen, touch-pad, speaker, microphone, or the like. User interface 702 provides user notifications as described above. Thus, user interface 702 might play audio messages or display text messages that notify the user of session drop and recovery status.

Processing circuitry 704 comprises microprocessor and other circuitry that retrieves and executes operating software 706 from memory system 705. Memory system 705 comprises a computer-readable storage medium, such as a disk drive, flash drive, data storage circuitry, or some other memory apparatus. Memory system 705 could be a single device or be distributed across multiple devices. Processing circuitry 704 is typically mounted on one or more circuit boards that may also hold memory system 704 and portions of components 701-702.

Operating software 706 comprises computer programs, firmware, or some other form of computer-readable processing instructions. Operating software 706 may include an operating system, utilities, drivers, network interfaces, applications, or some other type of software. When executed by processing circuitry 704, operating software 704 directs processing system 703 to implement the notification and protection for session drops as described herein for user communication devices 101 and 601-602.

Figure 8:
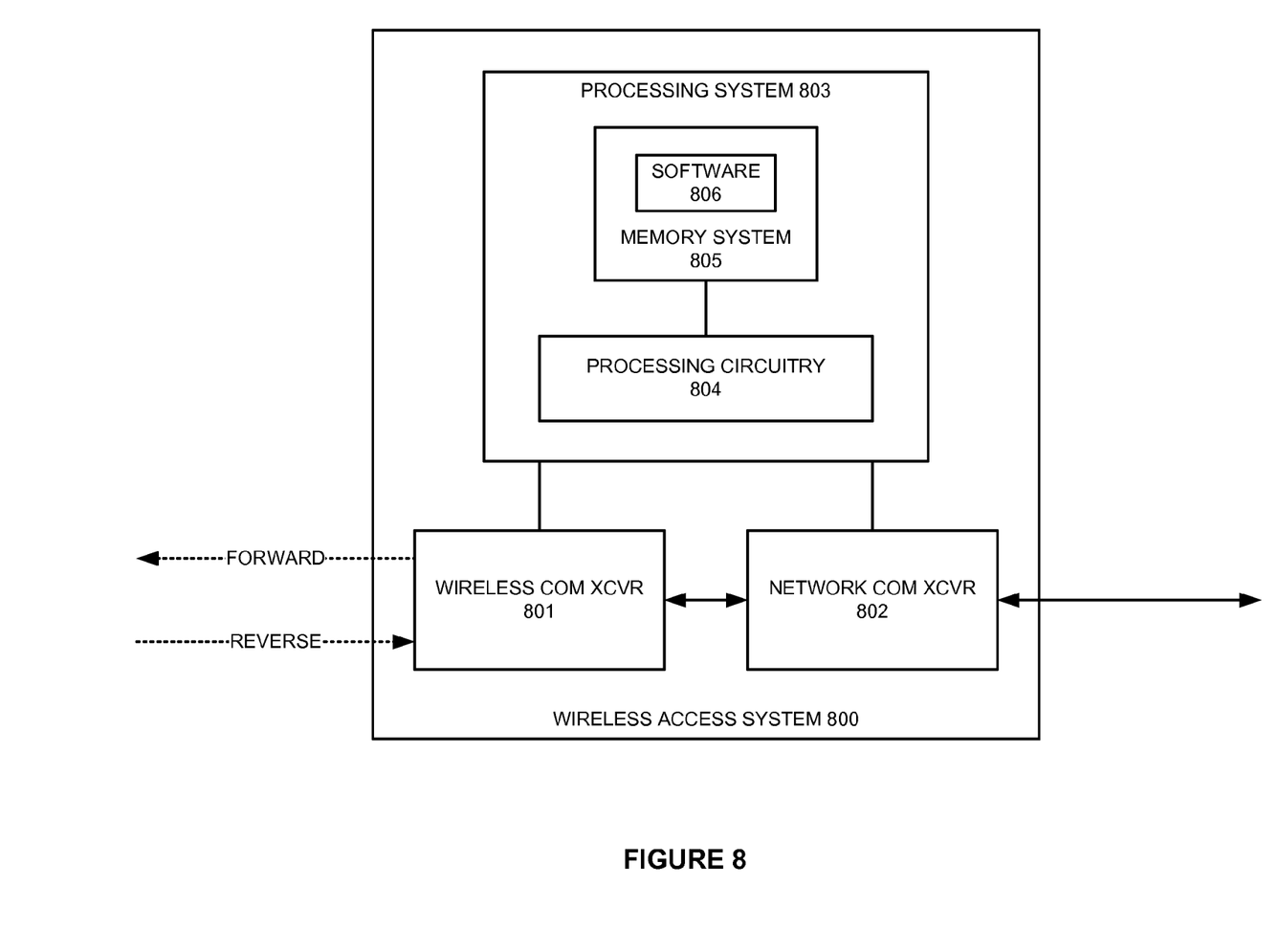
FIG. 8 illustrates a wireless access system to provide notification and protection for wireless communication session drops.

FIG. 8 illustrates wireless access system 800 to provide notification and protection for wireless communication session drops. Wireless access system 800 is an example of wireless access network 103 and base stations 603-604, although elements 103 and 603-604 may use alternative configurations. Wireless access system 800 could be a discrete system, a distributed system, or could be integrated into other systems. Wireless access system 800 comprises wireless communication transceiver 801, network communication transceiver 802, and processing system 803. Processing system 803 comprises processing circuitry 804 and memory system 805 that stores operating software 806. Processing system 803 is linked to communication transceivers 801-802, and wireless communication transceiver 801 is linked to network communication transceiver 802. Wireless access system 800 may include other well-known components that are not shown for clarity, such as routers, servers, computer systems, databases, and power systems.

Wireless communication transceiver 801 comprises an antenna, filter, amplifier, signal processing circuitry, software, and/or some other communication components. Communication transceiver 801 may use various wireless protocols for wireless communication, such as CDMA, GSM, EVDO, WIMAX, LTE, or some other wireless communication format—including combinations thereof. Wireless communication transceiver 801 receives wireless communications over reverse links and transfers wireless communications over forward links. Wireless communication transceiver 801 detects session loss over the reverse links and sends recovery probes over the forward links.

Network communication transceiver 802 comprises a physical communication port, signal processing circuitry, software, and/or some other communication components. Network communication transceiver 802 may use various protocols, such as IP, TDM, Ethernet, wireless, or some other network communication format—including combinations thereof. Network communication transceiver 902 exchanges communications with communication endpoints, including the transfer of session drop and recovery notices to the communication endpoints.

Processing circuitry 804 comprises microprocessor and other circuitry that retrieves and executes operating software 806 from memory system 805. Memory system 805 comprises a computer-readable storage medium, such as a disk drive, flash drive, data storage circuitry, or some other memory apparatus. Memory system 805 could be a single device or be distributed across multiple devices. Processing circuitry 804 is typically mounted on one or more circuit boards that may also hold memory system 805 and portions of communication transceivers 801-802.

Operating software 806 comprises computer programs, firmware, or some other form of computer-readable processing instructions. Operating software 806 may include an operating system, utilities, drivers, network interfaces, applications, or some other type of software. When executed by processing circuitry 804, operating software 806 directs processing system 803 to operate wireless access system 800 as described herein for wireless access network 103 and base stations 603-604.

Referring back to FIG. 1, user device 101 comprises an antenna and RF communication circuitry for wireless communication. The RF communication circuitry typically includes an amplifier, filter, RF modulator, and signal processing circuitry. User device 101 may also comprise processing circuitry, memory, software, and a user interface.

Wireless access network 103 comprises antennas and RF communication circuitry for wireless communication. The RF communication circuitry typically includes amplifiers, filters, RF modulators, and signal processing circuitry. Wireless access network 103 also comprises control systems that include processing circuitry, memory, software, and network communication interfaces. Wireless access network 103 may also include routers, servers, call processors, computer systems, communication links, and other communication network elements.

Communication links 111-112 are wireless links that use the air or space as the transport media. Communication links 111-112 may use various protocols, such as CDMA, GSM, EVDO, WIMAX, LTE, or some other wireless communication format—including combinations thereof. Communication links 111-112 could be direct links or may include intermediate networks, systems, or devices. Communication link 113 uses metal, glass, air, space, or some other material as the transport media. Communication link 113 could use various communication protocols, such as TDM, IP, Ethernet, CDMA, GSM, EVDO, WIMAX, LTE, or some other communication format—including combinations thereof. Communication link 113 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to provide a wireless communication session to a user device over a forward link and a reverse link, wherein the communication session is between the user device and a communication end-point, the method comprising:
   in a wireless access network, determining that dropped session protection is effective for the communication session;
   in the wireless access network, detecting session loss on the reverse link, and in response, transferring a session loss indication over the forward link to the user device and transferring a first notice indicating the session loss and the effective dropped session protection for delivery to the communication end-point; and
   in the wireless access network, detecting session recovery on the reverse link, and in response, transferring a session recovery indication over the forward link to the user device and transferring a second notice indicating the session recovery for delivery to the communication endpoint.

2. The method of claim 1 further comprising:
   in the user device, receiving the session loss indication over the forward link, and in response, notifying a user of the session loss and the effective dropped session protection and transferring session recovery probes over the reverse link; and wherein
   in the wireless access network, detecting the session recovery on the reverse link comprises receiving at least one of the session recovery probes.

3. The method of claim 1 further comprising, in the user device, receiving the session recovery indication over the forward link, and in response, notifying the user of the session recovery.

4. The method of claim 1 wherein the first notice indicating the session loss and the effective dropped session protection comprises an audio message.

5. The method of claim 1 wherein determining that dropped session protection is effective comprises determining that the user device is located within a predetermined geographic area.

6. The method of claim 5 wherein determining that dropped session protection is effective comprises determining that the predetermined geographic area has a dropped session history that exceeds a threshold.

7. The method of claim 1 wherein determining that dropped session protection is effective comprises determining an identity of the communication endpoint.

8. The method of claim 1 wherein determining that dropped session protection is effective comprises determining that a wireless communication measurement for the communication session exceeds a threshold.

9. The method of claim 1 wherein determining that dropped session protection is effective comprises receiving a user input requesting the dropped session protection during session initiation.

10. A method of operating a communication system to provide a wireless communication session to a user device over a forward link and a reverse link, wherein the communication session is between the user device and a communication end-point, the method comprising:
    in the user device, determining that dropped session protection is effective for the communication session;
    in the user device, detecting session loss on the forward link, and in response, transferring a session loss indication over the reverse link to a wireless access network and notifying a user of the session loss and the effective dropped session protection; and
    in the user device, detecting session recovery on the forward link, and in response, transferring a session recovery indication over the reverse link to the wireless access network and notifying the user of the session recovery.

11. The method of claim 10 further comprising:
    in the wireless access network, receiving the session loss indication over the reverse link, and in response, transferring a first notice for delivery to the communication endpoint indicating the session loss and the effective dropped session protection and transferring session recovery probes over the forward link; and wherein
    in the user device, detecting the session recovery on the forward link comprises receiving at least one of the session recovery probes.

12. The method of claim 10 further comprising, in the wireless access network, receiving the session recovery indication over the reverse link, and in response, transferring a second notice for delivery to the communication endpoint indicating the session recovery.

13. The method of claim 10 wherein the first notice indicating the session loss and the effective dropped session protection comprises an audio message.

14. The method of claim 10 wherein determining that dropped session protection is effective comprises determining that the user device is located within a predetermined geographic area.

15. The method of claim 14 wherein determining that dropped session protection is effective comprises determining that the predetermined geographic area has a dropped session history that exceeds a threshold.

16. The method of claim 10 wherein determining that dropped session protection is effective comprises determining an identity of the communication endpoint.

17. The method of claim 10 wherein determining that dropped session protection is effective comprises determining that a wireless communication measurement for the communication session exceeds a threshold.

18. The method of claim 10 wherein determining that dropped session protection is effective comprises receiving a user input requesting the dropped session protection during session initiation.

19. A communication system to provide a wireless communication session to a user device over a forward link and a reverse link, wherein the communication session is between the user device and a communication end-point, the communication system comprising:
- a wireless access network configured to determine that dropped session protection is effective for the communication session, detect session loss on the reverse link, and in response, transfer a session loss indication over the forward link to the user device and transfer a first notice indicating the session loss and the effective dropped session protection for delivery to the communication end-point;
- the user device is configured to receive the session loss indication over the forward link, and in response, notify a user of the session loss and the effective dropped session protection and transfer session recovery probes over the reverse link;
- the wireless access network is configured to detect session recovery on the reverse link, and in response, transfer a session recovery indication over the forward link to the user device and transfer a second notice indicating the session recovery for delivery to the communication endpoint; and
- the user device configured to receive the session recovery indication over the forward link, and in response, notify the user of the session recovery.

20. The communication system of claim 19 wherein:
the user device is configured to determine that the dropped session protection is effective for the communication session, detect session loss on the forward link, and in response, transfer the session loss indication over the reverse link to the wireless access network and notify a user of the session loss and the effective dropped session protection;

the wireless access network is configured to receive the session loss indication over the reverse link, and in response, transfer the first notice for delivery to the communication endpoint indicating the session loss and the effective dropped session protection and transfer the session recovery probes over the forward link;

the user device is configured to detect the session recovery on the forward link, and in response, transfer the session recovery indication over the reverse link to the wireless access network and notify the user of the session recovery; and the wireless access network is configured to receive the session recovery indication over the reverse link, and in response, transfer the second notice for delivery to the communication endpoint indicating the session recovery.

* * * * *